United States Patent
Choate et al.

(10) Patent No.: US 12,435,819 B2
(45) Date of Patent: Oct. 7, 2025

(54) ADJUSTABLE FLOWLINE CONNECTIONS

(71) Applicant: Baker Hughes Oilfield Operations LLC, Houston, TX (US)

(72) Inventors: Jeremy Choate, Houston, TX (US); Keith Adams, Katy, TX (US); Mahesha Udipi, Houston, TX (US); Brian N. Munk, Houston, TX (US); Blanca Estela Montoya, Houston, TX (US)

(73) Assignee: Baker Hughes Oilfield Operations LLC, Houston, TX (US)

( * ) Notice: Subject to any disclaimer, the term of this patent is extended or adjusted under 35 U.S.C. 154(b) by 0 days.

(21) Appl. No.: 18/236,025

(22) Filed: Aug. 21, 2023

(65) Prior Publication Data

US 2023/0392727 A1    Dec. 7, 2023

Related U.S. Application Data

(63) Continuation of application No. 16/991,848, filed on Aug. 12, 2020, now Pat. No. 11,754,211.

(51) Int. Cl.
*F16L 27/12* (2006.01)
(52) U.S. Cl.
CPC .................. *F16L 27/127* (2019.08)
(58) Field of Classification Search
CPC .................................................. F16L 27/127
See application file for complete search history.

(56) References Cited

U.S. PATENT DOCUMENTS

| 3,922,009 A | 11/1975 | Giebeler |
|---|---|---|
| 3,948,545 A | 4/1976 | Bonds |

(Continued)

FOREIGN PATENT DOCUMENTS

| CN | 103429840 | 12/2013 |
|---|---|---|
| WO | 2010/117554 | 10/2010 |

OTHER PUBLICATIONS

International Search Report and Written Opinion mailed Nov. 24, 2021 in corresponding PCT Application No. PCT/US2021/071142.

(Continued)

*Primary Examiner* — Matthew Troutman
*Assistant Examiner* — James A Linford
(74) *Attorney, Agent, or Firm* — Hogan Lovells US LLP

(57) ABSTRACT

A tubular connection system includes a connector coupled to a tubular segment, the connector having a first bore with a first bore diameter and a mating connector coupled to the connector, the mating connector having a second bore with a second bore diameter. The connector includes a plurality of connector lugs extending into the first bore. The connector also includes a plurality of gaps, respective gaps of the plurality of gaps are arranged between adjacent connector lugs of the plurality of connector lugs in a first alternating pattern. The plurality of connectors lugs are arranged in connector lug rows. The mating connector includes a plurality of mating lugs radially outward. The mating connector also includes a plurality of openings, respective openings of the plurality of openings are arranged between adjacent mating lugs of the plurality of mating lugs. The plurality of mating lugs are arranged in mating lug rows.

16 Claims, 8 Drawing Sheets

(56) References Cited

U.S. PATENT DOCUMENTS

| | | | |
|---|---|---|---|
| 3,971,576 A * | 7/1976 | Herd | E21B 33/047 |
| | | | 285/391 |
| 4,406,485 A | 9/1983 | Giebeler | |
| 7,213,655 B2 * | 5/2007 | Parrott | E21B 17/04 |
| | | | 285/391 |
| 8,365,754 B2 | 2/2013 | Riley | |
| 9,212,758 B2 | 12/2015 | Adams | |
| 10,094,195 B2 | 10/2018 | Guidry | |
| 2004/0207202 A1 | 10/2004 | Parks | |
| 2010/0054974 A1 | 3/2010 | Riley et al. | |
| 2013/0207382 A1 | 8/2013 | Robichaux | |
| 2017/0350223 A1 | 12/2017 | Guidry | |
| 2018/0320476 A1 * | 11/2018 | McEvoy | E21B 34/02 |

OTHER PUBLICATIONS

Office Action issued in corresponding UAE Application No. P6000291/2023, dated Feb. 19, 2025.

* cited by examiner

ADJUSTABLE FLOWLINE CONNECTIONS

CROSS REFERENCE TO RELATED APPLICATIONS

This application is a continuation of U.S. patent application Ser. No. 16/991,848 filed Aug. 12, 2020 titled "ADJUSTABLE FLOWLINE CONNECTIONS," the disclosure of which is hereby incorporated herein by reference in its entirety for all intents and purposes.

BACKGROUND

Field of the Disclosure

This disclosure relates in general to oil and gas tools, and in particular, to systems and methods for adjustable flowline connections.

Description of Related Art

In oil and gas production, various tubulars, valves, and instrumentation systems may be used to direct fluids into and out of a wellbore. For example, in hydraulic fracturing operations, frac trees may be arranged at a wellhead and include pipe spools and various valves to direct hydraulic fracturing fluid into the wellbore. If several trees are arranged proximate one another, fracturing may be done in series, with one frac tree being utilized before a second frac tree is used. The piping is typically hard piping, which may not be utilized for long periods of time while adjacent frac trees are used. Furthermore, the piping may be made up of a large number of small bore flowlines that connect to the wellhead at a manifold. Numerous small bore lines lead to a cluttered work side and the potential for leak points due to a larger number of connections. Making up the piping configurations may also be challenging because of the cluttered nature of the wellsite, along with restrictions such as placement of other equipment.

SUMMARY

Applicant recognized the limitations with existing systems herein and conceived and developed embodiments of systems and methods, according to the present disclosure, to improve the systems by forming adjustable flowline connections.

In an embodiment, a tubular connection system includes a connector coupled to a tubular segment, the connector having a first bore with a first bore diameter and a mating connector coupled to the connector, the mating connector having a second bore with a second bore diameter, the second bore diameter being smaller than the bore diameter. The connector includes a plurality of connector lugs extending into the first bore for a first radial distance, the connector lugs being positioned circumferentially about the first bore. The connector also includes a plurality of gaps, wherein respective gaps of the plurality of gaps are arranged between adjacent connector lugs of the plurality of connector lugs in a first alternating pattern. The plurality of connectors lugs are arranged in connector lug rows, axially separated by connector spaces, extending for a first row length axially along the first bore. The mating connector includes a plurality of mating lugs radially outward for a second radial distance, the mating lugs being positioned circumferentially about the second bore. The mating connector also includes a plurality of openings, wherein respective openings of the plurality of openings are arranged between adjacent mating lugs of the plurality of mating lugs in a second alternating pattern. The plurality of mating lugs are arranged in mating lug rows, axially separated by mating slots, extending for a second row length axially along the second bore.

In an embodiment, a flowline includes a first flowline segment, the first flow line segment being coupled to a fracturing tree at a first end, a second flowline segment, the second flow line segment coupled to a second end of the first flow line segment at a third end, and a connector joining the second end of the first flowline segment to the third end of the second flowline segment. The connector includes a plurality of connector lugs arranged circumferentially about a connector bore, the connector bore receiving at least a portion of the first flowline segment, the connector enabling axial movement between the first flowline segment and the second flow line segment when mating lugs associated with the first flow line segment are aligned with respective gaps between adjacent connector lugs of the plurality of connector lugs and blocking axial movement between the first flowline segment and the second flow line segment when the mating lugs associated with the first flowline segment are aligned with the plurality of connector lugs. At least one of the first flowline segment or the second flowline segment is rotatable about an axis to move between a first position enabling axial movement and a second position blocking axial movement.

In an embodiment, a flowline arranged at a fracturing site, the flowline extending in at least three directions between a manifold and a tree includes a first flowline segment, the first flowline segment having a first portion and a second portion coupled together via a first coupling arrangement, the first flowline segment arranged in a first direction, wherein a first flowline segment length is adjustable via axial movement of at least one of the first portion and the second portion at the first coupling arrangement. The flowline also includes a second flowline segment, the second flowline segment having a third portion and a fourth portion coupled together via a second coupling arrangement, the second flowline segment arranged in a second direction, different from the first direction, wherein a second flowline segment length is adjustable via axial movement of the third portion and the fourth portion at the second coupling arrangement. The flowline includes a third flowline segment, the third flowline segment having a fifth portion and a sixth portion coupled together via a third coupling arrangement, the third flowline segment arranged in a third direction, different from the first direction and the second direction, wherein a third flowline segment length is adjustable via axial movement of the fifth portion and the sixth portion at the third coupling arrangement.

BRIEF DESCRIPTION OF DRAWINGS

The present technology will be better understood on reading the following detailed description of non-limiting embodiments thereof, and on examining the accompanying drawings, in which.

DETAILED DESCRIPTION

Figure 1:
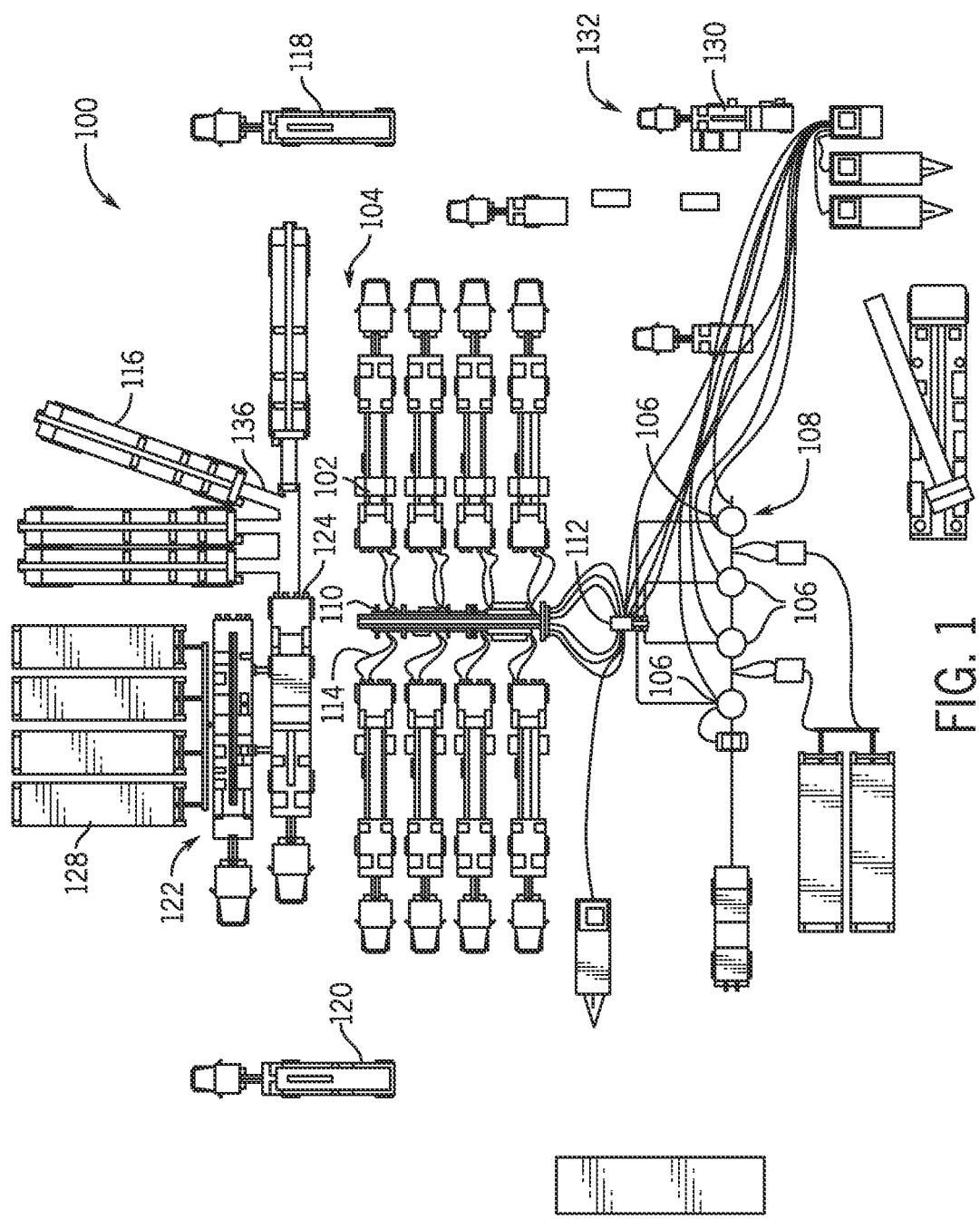
FIG. 1 is a schematic diagram of an embodiment of a fracturing site, in accordance with embodiments of the present disclosure.

The foregoing aspects, features and advantages of the present technology will be further appreciated when considered with reference to the following description of preferred embodiments and accompanying drawings, wherein like reference numerals represent like elements. In describing the preferred embodiments of the technology illustrated in the appended drawings, specific terminology will be used for the sake of clarity. The present technology, however, is not intended to be limited to the specific terms used, and it is to be understood that each specific term includes equivalents that operate in a similar manner to accomplish a similar purpose.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments. Additionally, it should be understood that references to "one embodiment", "an embodiment", "certain embodiments," or "other embodiments" of the present invention are not intended to be interpreted as excluding the existence of additional embodiments that also incorporate the recited features. Furthermore, reference to terms such as "above," "below," "upper", "lower", "side", "front," "back," or other terms regarding orientation are made with reference to the illustrated embodiments and are not intended to be limiting or exclude other orientations.

Embodiments of the present disclosure are directed toward adjustable flowline connectors that may include a lug system for adjustment instead of threads or studs and nuts. Accordingly, systems may enable the use of large bore flowlines, rather than numerous small bore flowlines, for example in fracturing operations. Embodiments include a plurality of lugs positioned about a connector and a flow line portion, which enables quick installation and adjustment without the time consuming and potentially costly use of studs, nuts, and threaded connections that are commonly used.

In various embodiments, the lug system utilized with the adjustable flowline connection takes the axial load of the flowline. Gaps between the lug system enables quick adjustment and installation. For example, in various embodiments the lug system may include inwardly extending lugs on a coupling portion and outwardly extending lugs on a flowline portion, the lugs may be positioned to contact each other in response to axial forces being applied to the coupling and/or flowline portions. Accordingly, axial movement is blocked. In various embodiments, multiple rows or sets of lugs may enable adjustments in axial position for the flowline overall.

Systems and methods of the present disclosure overcome current problems with flow operations, such as fracking operations. Currently, fracking operations use a large number of small bore flowlines to connect a wellhead to a manifold. The flowlines carry pressurized fluid with sand to be injected downhole into an underground formation to facilitate recovery of oil and gas. Having numerous small bore flowlines causes the worksite to be cluttered and the numerous flowline connections present more potential leak paths. Also, hammer unions are typically used on the current flowline connections, which present a hazard. Embodiments overcome these problems by using the described adjustable flow line connection incorporating the lug system. The lug system may replace traditional connectors, such as treads or studs and nuts. Accordingly, large diameter flow lines may be used in place of the numerous small bore flowlines. Furthermore, adjustment of the flowlines is simplified by adjusting an axial position of the coupling portion, rather than reworking or cutting and reinstalling small bore flowlines. Advantageously, well sites utilizing embodiments of the present disclosure may be less cluttered, for example with fewer flowlines since a large bore line can now be used. Additionally, the well site may eliminate or reduce hammer union hazards. Additionally, time may be saved by eliminating or reducing stud torqueing. Moreover, a reduced number of possible leak paths is provided.

FIG. 1 is a schematic environmental view of an embodiment of a hydraulic fracturing operation 100. In the illustrated embodiment, a plurality of pumps 102 are mounted to vehicles 104, such as trailers, for directing fracturing fluid into trees 106 that are attached to wellheads 108 via a missile 110. The missile 110 receives the fluid from the pumps 102 at an inlet head 22, in the illustrated embodiment. As illustrated, the pumps 102 are arranged close enough to the missile 110 to enable connection of fracturing fluid lines 114 between the pumps 102 and the missile 110. It should be appreciated that while the illustrated embodiments includes a missile trailer, that various other embodiments may substitute the missile trailer for a collection of spools and/or crosses, which may be mounted to a skid or trailer, or arranged at the wellsite as fixed piping, among other such options. Accordingly, recitation of a missile herein is not intended to restrict embodiments to missile trailers, but rather, to collectively refer to supply piping that collects an output from one or more high pressure pumps.

FIG. 1 also shows equipment for transporting and combining the components of the hydraulic fracturing fluid or slurry used in the system of the present technology. However, for clarity, the associated equipment will not be discussed in detail. The illustrated embodiment includes sand transporting containers 116 (which may include modular transport systems, pneumatic transport systems, silos, and the like), an acid transporting vehicle 118, vehicles for transporting other chemicals 120, and a vehicle carrying a hydration unit 122. Also shown is a fracturing fluid blender 124, which can be configured to mix and blend the components of the hydraulic fracturing fluid, and to supply the hydraulic fracturing fluid to the pumps 102. In the case of liquid components, such as water, acids, and at least some chemicals, the components can be supplied to the blender 124 via fluid lines (not shown) from the respective components vehicles, or from the hydration unit 122. In the case of solid components, such as sand, the components can be delivered to the blender 124 by conveyors 126. The water can be supplied to the hydration unit 32 from, for example, water tanks 128 onsite. Alternately, water can be provided directly from the water tanks 128 to the blender 124, without first passing through the hydration unit 122.

In various embodiments, monitoring equipment 130 can be mounted on a control vehicle 132, and connected to, e.g., the pumps 102, blender 124, the trees 106, and other downhole sensors and tools (not shown) to provide information to an operator, and to allow the operator to control different parameters of the fracturing operation.

As illustrated schematically in FIG. 1, there are several lines indicating piping between various components. These lines may include rigid piping systems that also include various instruments, controllers, and the like. As noted above, in operation, these lines may be established prior to fracturing operations and the valves are controlled to direct fluid between the wellheads 108. The lines may utilize large amounts of materials and also have a number of different potential leak points, as joints that make up connections between line segments could potentially leak. As will be described below, various embodiments of the present disclosure may reduce the number of flowline at the site to provide simplicity for routing fluid flows. Furthermore, embodiments may provide for systems and methods to enable adjustments between flowlines without reworking piping arrangements.

Figure 2:
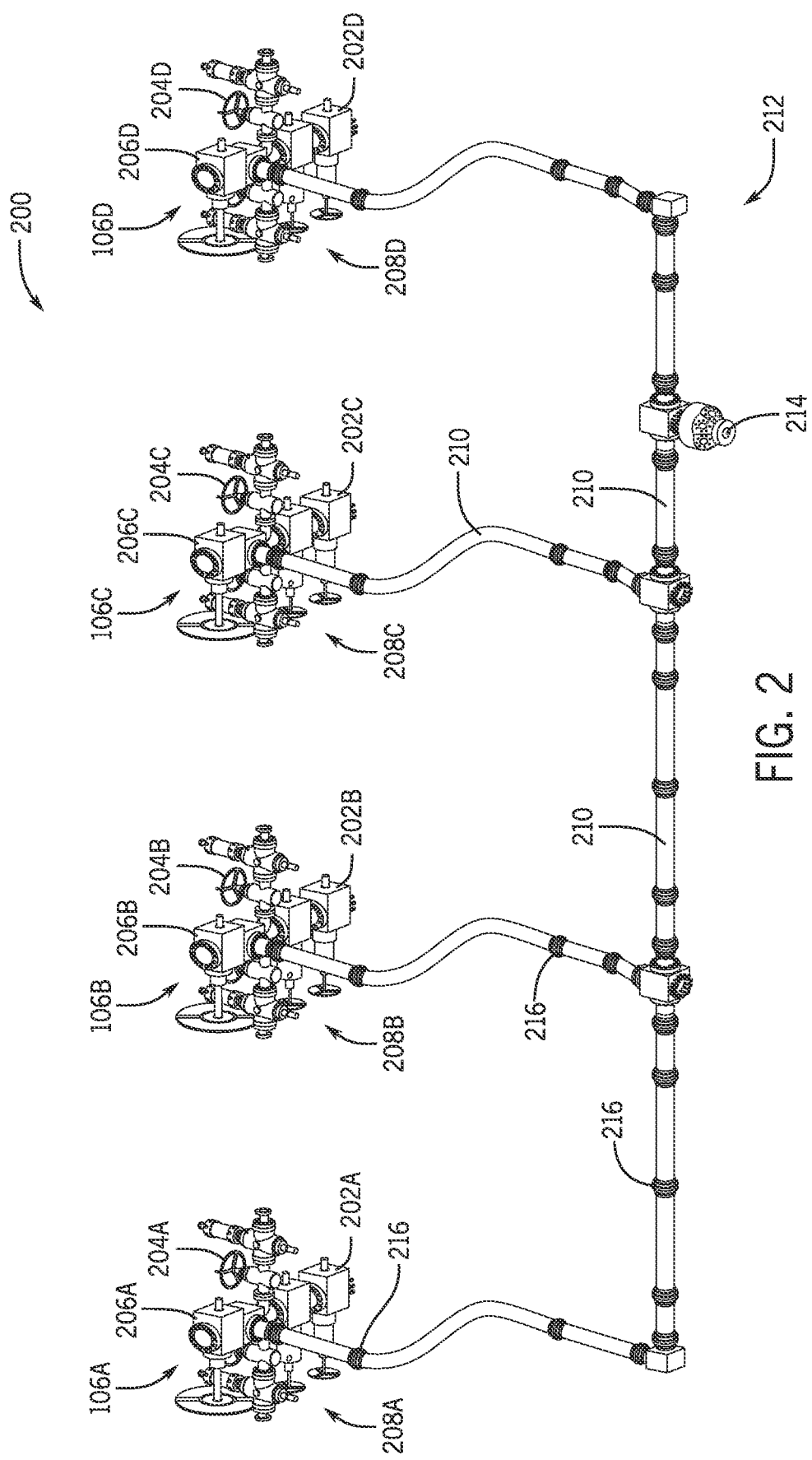
FIG. 2 is a schematic diagram of an embodiment of a multi-well fracturing configuration, in accordance with embodiments of the present disclosure.

FIG. 2 is a schematic perspective view of an embodiment of a fracturing operation including four trees 106, each tree having a plurality of associated valves. The fracturing operation illustrated in FIG. 2 may be used in so-called "zipper" fracturing operations, in which numerous trees 106 are arranged in relatively close proximity. It should be appreciated that the proximity between the trees 106 may vary depending on the fracturing operation. That is, the wells may be arranged at any reasonable distance apart from one another, and in embodiments, the wells may be within a pressure zone of an adjacent well. During operations, hydraulic fracturing is performed on a well using a first tree, while the remaining trees are not in operation. As operations with the first tree complete, then operations on the second tree may begin, and so on. It should be appreciated that various features have been eliminated for simplicity and that embodiments may be described with reference to fracturing operations, but are not limited to only fracturing operations.

The illustrated environment 200 includes trees 106A-106D. Each tree 106 is associated with a respective wellhead (not pictured) and includes a lower master valve 202A-202D, wing valves 204A-204D, swab valves 206A-206D, and other valves 208A-208D. It should be appreciated that the systems and methods described herein may be utilized with any of the valves and/or connectors associated with the respective trees 106. As described above, the trees 106 receive hydraulic fracturing fluid, for example from the missile 110, which is directed into the well via the trees 106. The valves associated with the trees 16 may be utilized to block or restrict flow into the well. In the illustrated embodiment, various piping segments 210 are coupled together to form a collective manifold system 212. The manifold system 212 may include one or more valves to regulate fluid flow between the trees 106. The manifold system 212 includes an inlet 214 that may receive fluid, for example, from the missile 110. In various embodiments, a number of high pressure fluid streams are collected, for example at the missile 110, and then directed to the inlet 214. Moreover, a number of missiles 110 may be arranged at the well site and then flow from one or more missile 110 may be directed toward the manifold system 212.

As illustrated, the manifold system 212 includes numerous piping segments 210 that include a variety of configurations, such as straight sections, elbows, and the like. Each of the illustrated segments 210 includes connectors 216 (e.g., couplings, unions, etc.) are each end, which may be associated with a mating coupling or union. It should be appreciated that these connectors 216 may include flanges, hammer unions, and the like. Because of the pressures associated with fracturing operations, rigid piping may be utilized, which may include various connectors, welds, etc. to facilitate connection to the trees 106. As a result, there may be little room to adjustment between the components. For example, the wellheads 108 (not pictured) are fixed in position, along with the associated trees 106. Accordingly, the piping is configured to couple to the trees 106. Small differences in size, errors in measurement, and the like may lead to rework or disassembly of the manifold system 212 when different segments are not properly aligned. Embodiments of the present disclosure may address this problem by providing systems and methods for axially adjusting a length of a pipe segment. That is, systems may include a lug system that enables a coupling component to adjust an axial position relative to a flowline component to shorten or lengthen an overall segment length, thereby facilitating adjustments to the piping configuration without reworking large areas of piping. Furthermore, embodiments may also enable faster coupling of components together, for example, by eliminating one or more fasteners or unions utilized to join segments together.

Figure 3:
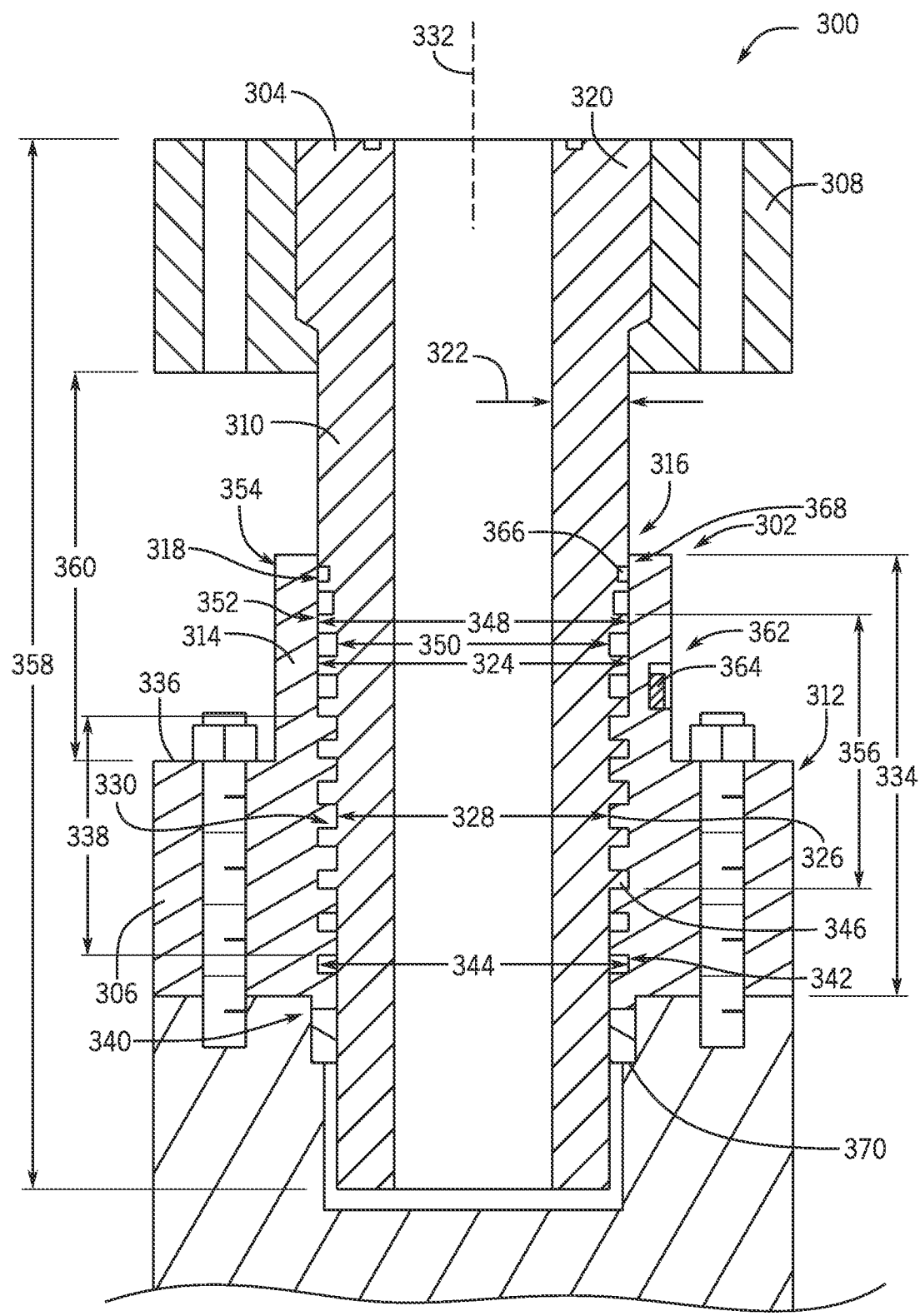
FIG. 3 is a cross-sectional view of an embodiment of a flowline with a coupling arrangement, in accordance with embodiments of the present disclosure.

FIG. 3 is a cross-sectional side view of an embodiment of a coupling arrangement 300, which may include a lug system 302 for joining segments 304, 306 together. As will be described below, the lug system 302 may include a series of lugs on each of the segments 304, 306 to facilitate coupling between the components where axial alignment of the lugs may restrict axial movement while axial misalignment of the lugs may enable axial movement.

In various embodiments, the segment 304 may be referred to as a coupling segment or mating connector while the segment 306 may be referred to as a tubular segment or a tubular segment having a connector. Such labels are for reference only and are utilized for simplicity and clarity with the present discussion, as the segment 304 includes a flange 308, which is utilized to couple the segment 304 to a mating flange. In this embodiment, the segment 304 also includes a tubular segment 310 that couples to the segment 306 via a connector 312. The illustrated connector 312 is shown as being bolted to a mating component, which may form at least a portion of the segment 306, but it should be appreciated that bolts are shown for illustrative purposes only and that other couplings may be used, such as threaded fittings, welds, and the like. As will be described below, the coupling segment 304 includes features (e.g., lugs) to facilitate coupling to the connector 312, which also includes mating lugs, which may form at least a portion of the lug system 302.

The connector 312 in the illustrated embodiment includes a body portion 314 having a bore 316 that receives at least a portion of the segment 304, which in this embodiment correspond to a lugged portion 318. In other words, the lugged portion 318 is formed directly into the body of the segment 304. In various embodiments, the segment 304 is represented by a tubular 320 having a wall thickness 322 particularly selected to accommodate the lugged portion 318 while also maintaining particularly selected pressure containing characteristics. The illustrated bore 316 has a bore diameter 324, which is large enough to receive the segment 304. Further included within the bore 316 are connector lugs 326, which extend radially inward into the bore 316. As a result, a connector lug diameter 328 is smaller than the bore diameter 324. As will be described below, a connector lug radial length may be particularly selected based on operating conditions. The connector lugs 326 may be arranged to extend circumferentially about the bore 316 and may be separated by gaps (not pictured) arranged between adjacent connector lugs 326. In various embodiments, the gaps may be sized to permit axial movement of the segment 304 relative to the connector 312.

The connector 312 in FIG. 3 includes multiple rows 330 of connector lugs 326. These rows are axially spaced along an axis 332 of the bore 316. In other words, one row of the rows 330 may be axially higher than another row. A distance separating the rows 330 may be particularly selected based on operating conditions, mating components, and the like. It should be appreciated that the number of rows 330 may vary based on a variety of factors. For example, the number of rows 330 may be particularly selected based on expected operating conditions. Furthermore, the number of rows may be selected, based at least in part, on a connector length 334. Additionally, the number of rows may vary based on a desired degree of axial freedom with respect to the coupling arrangement 330. In this embodiment, there are 6 rows 330. A first row 330, which may also be referred to as the top row, starts axially above a connector flange area 336, but it should be appreciated that this location is for illustrative purposes only. Thereafter, the rows 330 extend for a row length 338, which is less than the connector length 334. The rows 330 terminate axially above a connector bottom 340, which in this embodiment extends at least partially into the mating component for coupling to the segment 306.

The illustrated rows 330 are separated by spaces 342, which may be annular spaces that extend circumferentially about the bore 316. In various embodiments, a space diameter 344 is equal to the bore diameter 324. In other words, the spaces 342 may be formed or represented by an absence of the connector lugs 326.

Turning to the segment 304, the lugged portion 318 includes mating lugs 346. In this embodiment, the lugged portion 318 includes a mating lug diameter 348, which represents a radially outward extension of the mating lugs 346. This mating lug diameter 348 is larger than a slot diameter 350 formed by slots 352 positioned between rows 354 of the mating lugs 346. As noted above with respect to the connector lugs 326, the mating lugs 346 may extend circumferentially about the axis 332 and be separated by gaps (not pictured) between adjacent mating lugs 346.

As shown in FIG. 3, there are multiple rows 354 of mating lugs 346. It should be appreciated that the number of mating lugs 346 may be particularly selected based on one or more factors, such as operating conditions, the connector lugs 326, or the like. In this embodiment, there are 7 rows of mating lugs 346. It should be appreciated that there may be more or fewer rows 354 of mating lugs 346 than rows 330 of connector lugs 326. Also, the number of rows 354, 330 may be equal. The rows 354 extend for a row length 356, which is less than a segment length 358. As noted above, each of these lengths 356, 358 may be particularly selected based on operating conditions or the like.

In operation, the segment 304 and the segment 306 are axially aligned along the axis 332 and arranged such that the connector lugs 326 are not aligned with the mating lugs 346. In other words, the connector lugs 326 are aligned with gaps between the mating lugs 346 and the mating lugs 346 are aligned with gaps between the connector lugs 326. As a result, axial movement along the axis 332 is enabled. An operator may move at least one of the segment 304 or the segment 306 relative to the other and align the lugs 326, 342 with the space 342 and slot 350 at a desired position. Thereafter, at least one of the segment 304 or the segment 306 is rotated to axially align the lugs 326, 346, thereby restricting further axial movement. Accordingly, an overall axial length 360 may be adjusted. As shown in FIG. 3, the axial length 360 may be represented by the distance between the flange 308 and the flange area 336. By adjusting the respective position of the rows 330, 354, the axial length 360 may be adjusted. Such adjustment may be advantages to make up differences in length between piping segments. It should be appreciated that combining multiple coupling arrangements 300 in different directions (e.g., with a horizontal orientation, with a vertical orientation, etc.), that various degrees of freedom will be enabled for different sections of the piping.

In various embodiments, the connector 312 also includes a locking assembly 362, which may be utilized to block rotation of the segment 304 about the axis 332 and/or block rotation of the segment 304 about the axis 332. The locking assembly 362 may include one or more locking extensions 364 that extend into a gap (not pictured), slot 352, or space 342 between at least one of the connector lugs 326 and/or the mating lugs 346. As a result, rotation may be blocked because adjacent lugs 326, 346 may contact the extension 364 in response to the rotation. In this manner, the segment 304 may be locked in place with respect to the segment 306.

Embodiments also include a seal 366 positioned in a groove 368 formed in the segment 306 axially higher than the rows 354. However, it should be appreciate that the seal 366 may also be arranged within a groove formed in the connector 312. The seal 366 may block leakage of fluid from within the system. Furthermore, in embodiments, the connector bottom 340 may also include a seal 370 for coupling to the mating component.

Figure 4:
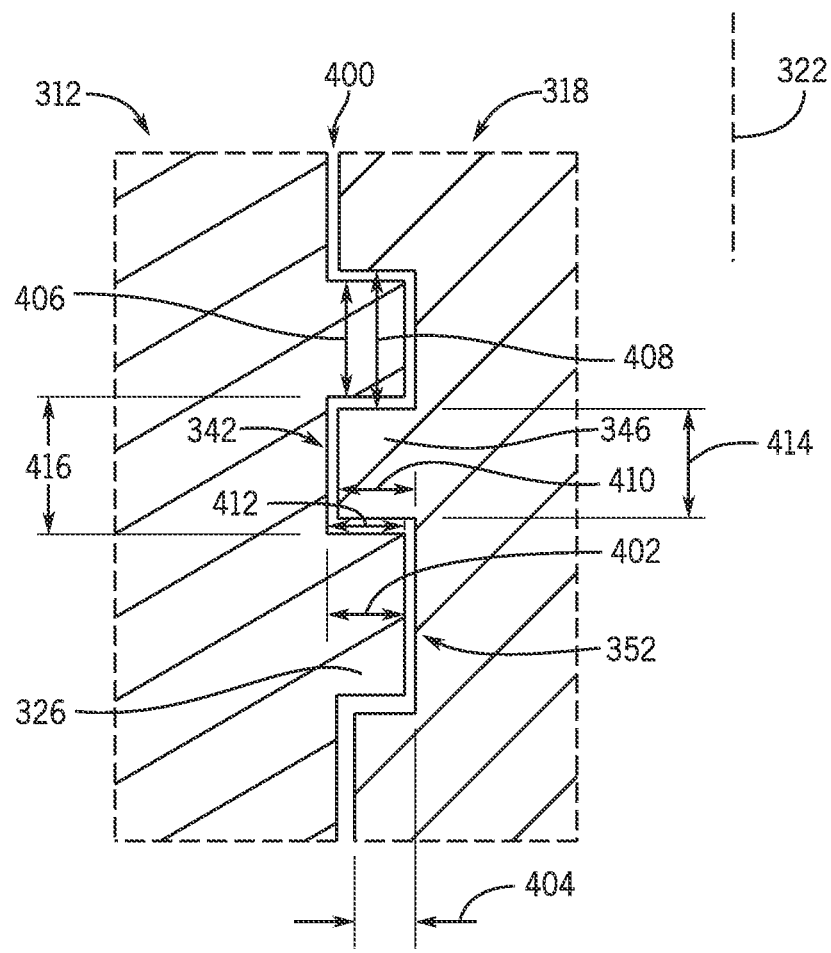
FIG. 4 is a cross-sectional view of an embodiment of an interface of a coupling arrangement, in accordance with embodiments of the present disclosure.

FIG. 4 is a detailed cross-sectional view of an embodiment of an interface 400 of the lug system 302. In the illustrated embodiment, the connector 312 is coupled to the lugged portion 318 via interaction between the lugs 326, 346, where axial movement along the axis 322 is restricted due to alignment between the lugs 326, 346. In the illustrated embodiment, the lugs 326 are arranged within the slots 352 and the lugs 346 are within the spaces 342. In this example, the lugs 326 have a first radial distance 402, which substantially corresponds to a slot depth 404. That is, the lugs 326 are shaped to engage the slot 352. This is further illustrated by the first axial distance 406 of the lugs 326, which substantially correspond to a slot axial height 408. Accordingly, the lugs 326 may be positioned within the slots 352. It should be appreciated that the gaps illustrated in FIG. 4 are for illustrative purposes only and that the gaps may be larger, smaller, or non-existent.

Similarly, the lugs 346 have a second radial distance 410, which substantially corresponds to a space depth 412. That is, the lugs 346 are shaped to engage the space 342. This is further illustrated by the second axial distance 414 of the lugs 352, which substantially correspond to a space axial height 416. Accordingly, the lugs 346 may be positioned within the spaces 342. It should be appreciated that the gaps illustrated in FIG. 4 are for illustrative purposes only and that the gaps may be larger, smaller, or non-existent.

In various embodiments, each of the connector lugs 326 may have the same radial distance 402 and axial length 406. However, it should be appreciated that different connector lugs 326 may be differently sized. Similarly, each of the mating lugs 346 may have same radial distance 410 and axial length 414, or may be different depending on design considerations. Furthermore, it should be appreciated that the lugs 326, 346 may also have different sizes or may be the same size. Moreover, the spaces 342 and slots 352 may be the same or different sizes. Accordingly, dimensions of various components may be particularly selected for design conditions, ease of assembly, ease of manufacture, or the like.

Figure 5:
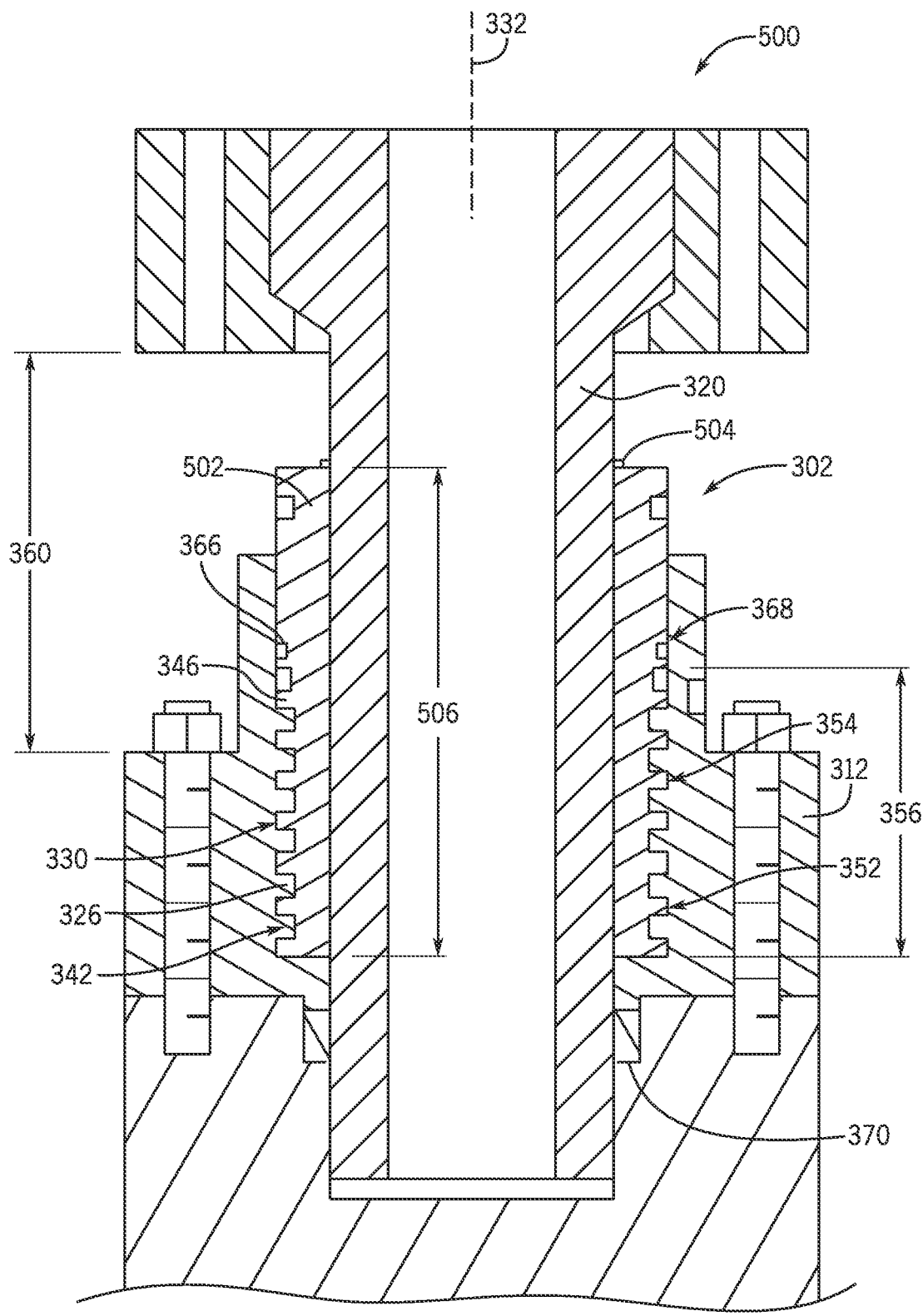
FIG. 5 is a cross-sectional view of an embodiment of a flowline with a coupling arrangement, in accordance with embodiments of the present disclosure.

FIG. 5 is a cross-sectional view of an embodiment of a coupling arrangement 500 including the lug system 302 where a sleeve 502 includes the mating lugs 346, rather than having the mating lugs 346 formed directly on the tubular 320. The illustrated sleeve 502 may be coupled to the sleeve 502, for example via fittings 504 such as lock washers or the like, to restrict axial movement between the sleeve 502 and the tubular 320. Thereafter, the sleeve 502, which may have a sleeve length 506 including the row length 356, may be coupled to the connector 312 via interaction between the lugs 326, 346. As will be appreciated, inclusion of the sleeve 502 may enable existing components to be retrofit to work with the connector 312, rather than machining the lugs 326 into the tubular 320. In various embodiments, the seals 366, 370 are still positioned within the system, with the exception that the groove 368 is formed in the sleeve 502 and not the tubular 320.

Operation of the illustrated coupling arrangement 500 may be similar to that shown in FIG. 3, in that the sleeve 502 and/or the connector 312 is rotated about the axis 332 to adjust alignment between the lugs 326, 346 to facilitate axial movement of the sleeve 502 and/or the connector 312 with respect to one another. The overall axial length 360 may be adjusted by changing which respective rows 330, 354 align with difference respect spaces 342 and slots 352.

Figure 6:
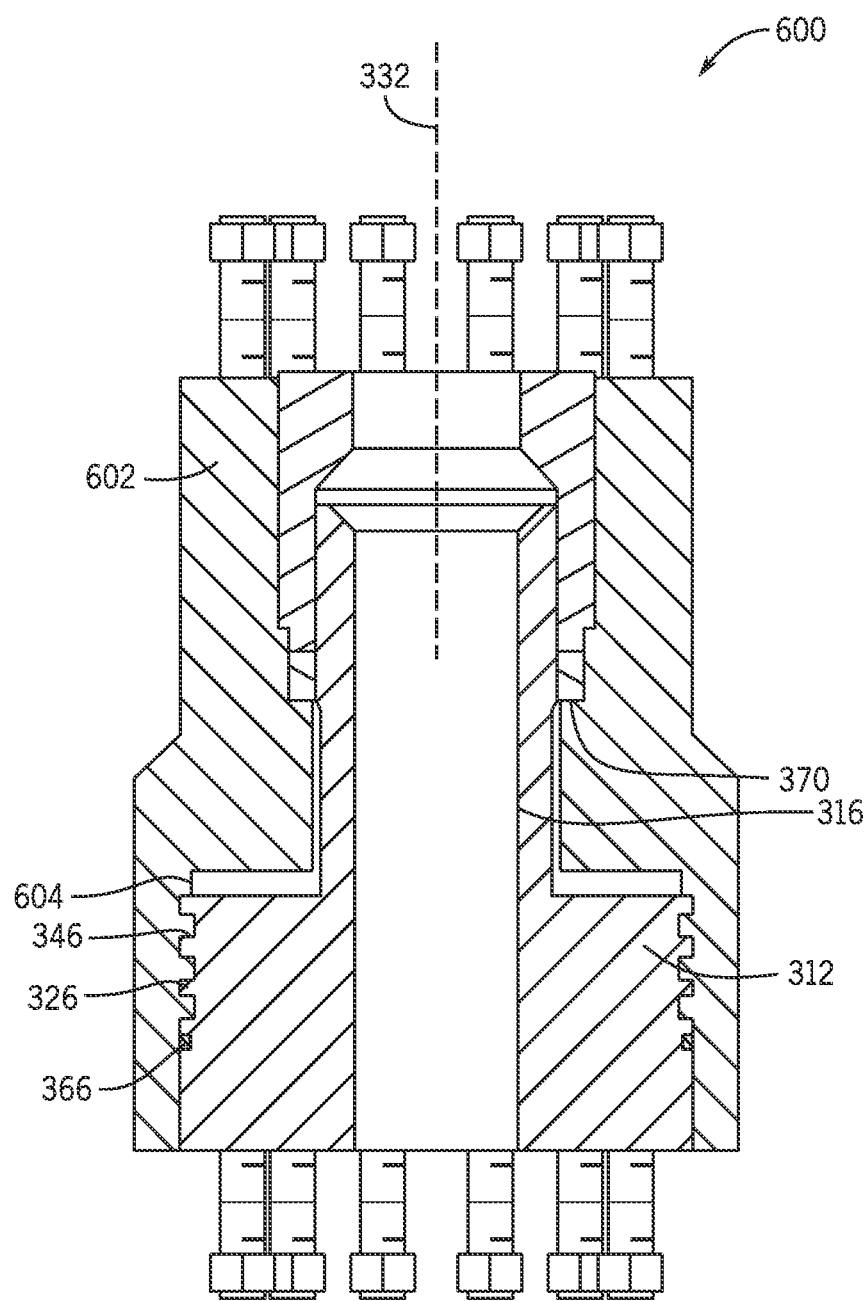
FIG. 6 is a cross-sectional view of an embodiment of a flowline with a coupling arrangement, in accordance with embodiments of the present disclosure.

FIG. 6 is a cross-sectional view of an embodiment of a coupling arrangement 600 in which the connector 312 is now surrounded by a frac head 602, rather than having the mating component extend through a bore of the connector 312, as shown in FIGS. 3 and 5. That is, the illustrated connector 312 include the lugs 326, however, in FIG. 6, they extend radially outward from the bore 316, rather than radially inward. Moreover, the mating lugs 346 are arranged on the frac head 602 that encompasses the connector 312 within a head bore 604, the mating lugs 346 extending radially inward.

The illustrated embodiment includes the seals 366, 370, as described above, to facilitate make up and use in the field. In operation, the frac head 602 may be aligned with the connector 312 and then the respective lugs 326, 346 are misaligned to enable axial movement. Upon reaching a desired position to stop further axial movement, the frac head 602 may be rotated about the axis 332 to align the lugs 326, 346, thereby blocking further axial movement, as described above.

Figure 7B:
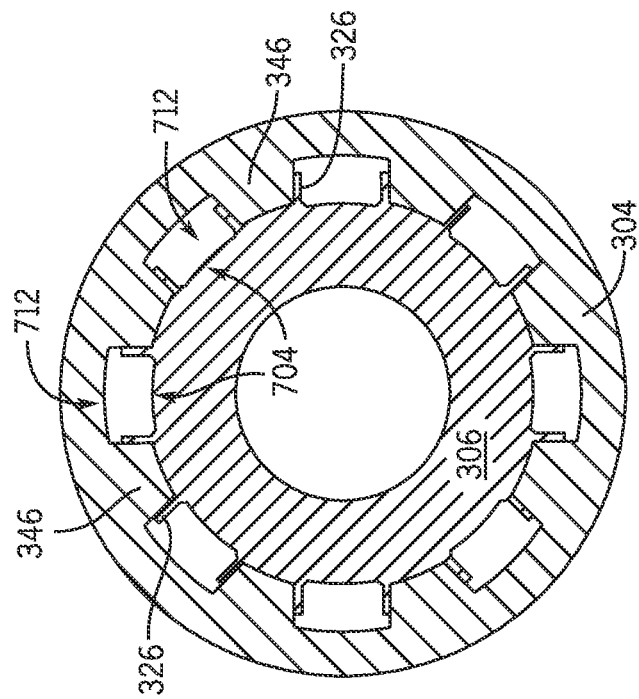
FIGS. 7A and 7B are cross-sectional views of an embodiment of a coupling arrangement, in accordance with embodiments of the present disclosure.
Figure 7A:
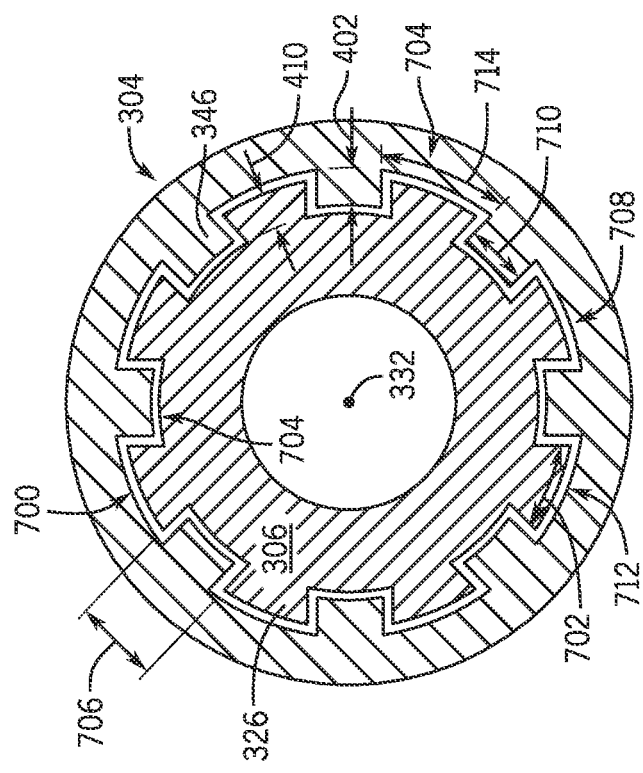

FIGS. 7A and 7B are cross-sectional views of the lug system 202 joining the segment 304 to the segment 306. In the illustrated embodiment, the segment 304 is illustrated as being coaxially aligned with the segment 306. Particularly, the connector 312 is arranged radially outward from the tubular segment 320 (FIG. 3). As described above, in various embodiments, the connector 312 includes the plurality of connector lugs 326 arranged circumferentially about an interior circumference 700 of the connector 312 for a first distance 702. The illustrated connector lugs 326 extend radially inward toward the axis 332 the first radial distance 402. As shown, connector lugs 326 are positioned as being separated from adjacent lugs by the gaps 704, which extend for a second distance 706.

The illustrated embodiment includes the tubular 320 of the segment 306 having the mating lugs 346 extending radially outward the second radial distance 410. The plurality of mating lugs 346 extend circumferentially about an outer circumference 708 for a third distance 710. As shown, mating lugs 346 are positioned as being separated from adjacent lugs 346 by openings 712, which span for a fourth distance 714. As described above, the connector 312 and the tubular 320 are arranged such that the mating lugs 346 may pass through the gaps 706 and the connector lugs 326 may pass through the openings 712. As a result, axial movement between the segments 304, 306 is enabled to facilitate coupling of the components.

FIG. 7B illustrates rotational movement of the tubular 320 such that the mating lugs 346 are aligned with the connector lugs 326, blocking axial movement of the tubular 320 relative to the connector 312. In the illustrated embodiment, the respective gaps 706 and openings 712 are also aligned. Axial movement of the tubular 320 relative to the connector 312 is blocked by an interference between the lugs 326, 346, and further rotation of the tubular 320 may be blocked via the locking assembly 362, described above. As a result, the components may be coupled together to resist axial movement without including external fasteners.

Figure 8:
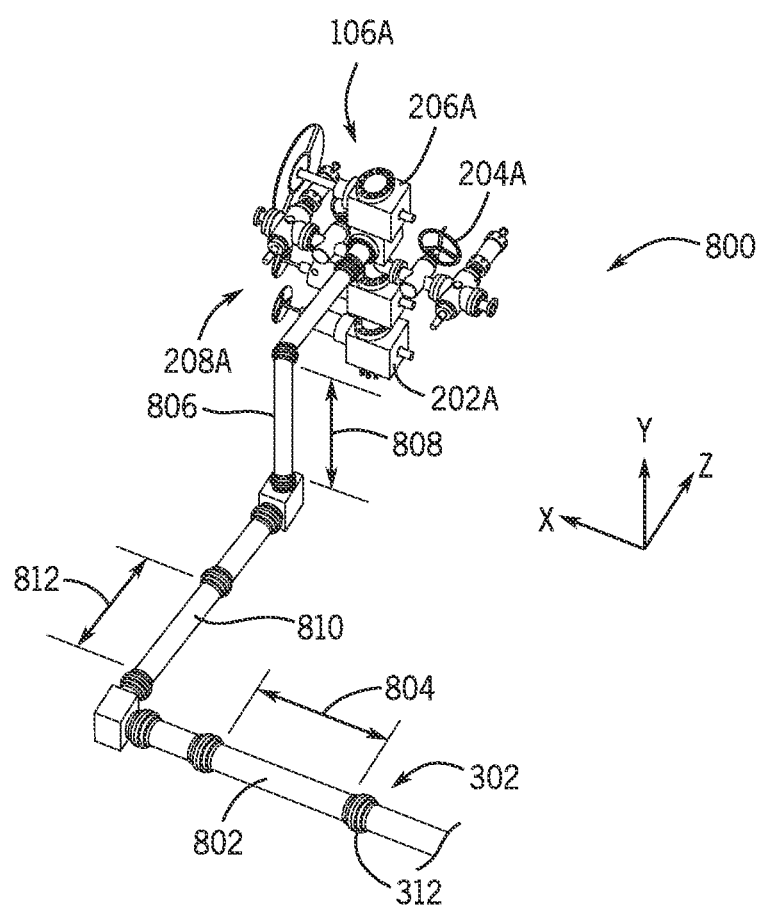
FIG. 8 is a schematic diagram of an embodiment of a flowline configuration, in accordance with embodiments of the present disclosure.

FIG. 8 is a schematic diagram of a wellsite configuration 800 incorporating the lug system 302 within the connectors 312. As will be appreciated, utilizing the lug system 302 in particular configurations enables freedom of adjustment in three axes. That is, a first segment 802 may utilize the lug system 302 to adjust a first segment length 804 in the x-direction, a second segment 806 may utilize the lug system 302 to adjust a second segment length 808 in a y-direction, and a third segment 810 may utilize the lug system 302 to adjust a third segment length 812 in a z-direction. Accordingly, different adjustments may be utilized to modify various dimensions, thereby accommodating minor misalignment without reworking or tearing down piping segments. In this manner, well site operations may be more streamlined and capable of adjustment. Furthermore, embodiments eliminate various threaded and/or bolted connections, thereby saving time for connecting the segments together. Moreover, as noted above, large diameter piping may be utilized, this decreases clutter at the site.

The foregoing disclosure and description of the disclosed embodiments is illustrative and explanatory of various embodiments of the invention. Various changes in the details of the illustrated embodiments can be made within the scope of the appended claims without departing from the true spirit of the disclosure. The embodiments of the present disclosure should only be limited by the following claims and their legal equivalents.

The invention claimed is:
1. A flowline, comprising:
a first flowline segment, the first flowline segment being coupled to a fracturing tree at a first end;
a second flowline segment, the second flowline segment coupled to a second end of the first flowline segment at a third end; and
a connector joining the second end of the first flowline segment to the third end of the second flowline segment, the connector having a plurality of connector lugs arranged circumferentially about a connector bore, the connector bore receiving at least a portion of the first flowline segment, the connector enabling axial movement between the first flowline segment and the second flowline segment when mating lugs associated with the first flowline segment are aligned with respective gaps between adjacent connector lugs of the plurality of connector lugs and blocking axial movement between the first flowline segment and the second flowline segment when the mating lugs associated with the first flowline segment are aligned with the plurality of connector lugs, wherein at least one of the first flowline segment or the second flowline segment is rotatable about an axis to move between a first position enabling axial movement and a second position blocking axial movement;

wherein the connector is secured to the second flowline segment by one or more fasteners positioned radially outward from and parallel to the connector bore, the one or more fasteners extending through the connector at a connector flange area and into the second flowline segment.

2. The flowline of claim 1, wherein an overall flowline length is adjustable based on a position of the first flowline segment relative to the second flowline segment, the first flowline segment being movable over a row length that includes a plurality of rows of mating lugs.

3. The flowline of claim 1, further comprising:
openings between adjacent mating lugs of the plurality of mating lugs, wherein axial movement between the first flowline segment and the second flowline segment includes passage of respective connector lugs through respective openings.

4. The flowline of claim 1, further comprising:
a plurality of rows, extending along a row length of the connector, each row of the plurality of rows including at least a first portion of the plurality of connector lugs; and
a plurality of spaces, wherein a respective space of the plurality of spaces is positioned between adjacent rows of the plurality of rows, the respective space having an axial length adapted to receive the mating lugs.

5. The flowline of claim 1, further comprising:
a plurality of rows, each row of the plurality of rows including at least a first portion of the mating lugs; and
a plurality of slots, wherein a respective slot of the plurality of slots is positioned between adjacent rows of the plurality of rows, the respective slot having an axial length adapted to receive the connector lugs.

6. A flowline arranged at a fracturing site, the flowline extending in at least three directions between a manifold and a tree, the flowline comprising:
a first flowline segment, the first flowline segment having a first portion and a second portion coupled together via a first coupling arrangement, the first flowline segment arranged in a first direction, wherein a first flowline segment length is adjustable via axial movement of at least one of the first portion and the second portion at the first coupling arrangement and a first flow path between the first portion and the second portion is maintained during the axial movement;
a second flowline segment, the second flowline segment having a third portion and a fourth portion coupled together via a second coupling arrangement, the second flowline segment arranged in a second direction, different from the first direction, wherein a second flowline segment length is adjustable via axial movement of the third portion and the fourth portion at the second coupling arrangement and a second flow path between the third portion and the fourth portion is maintained during the axial movement; and
a third flowline segment, the third flowline segment having a fifth portion and a sixth portion coupled together via a third coupling arrangement, the third flowline segment arranged in a third direction, different from the first direction and the second direction, wherein a third flowline segment length is adjustable via axial movement of the fifth portion and the sixth portion at the third coupling arrangement and a third flow path between the fifth portion and the sixth portion is maintained during the axial movement;
wherein each of the first coupling arrangement, the second coupling arrangement, and the third coupling arrangement comprises:
a connector, comprising:
a plurality of connector lugs extending circumferentially about a connector bore;
a plurality of gaps, wherein respective gaps of the plurality of gaps are arranged between adjacent connector lugs of the plurality of connector lugs; and
a plurality of connector lug rows, axially separated by connector spaces, extending for a first row length; and
a mating connector, comprising:
a plurality of mating lugs;
a plurality of openings, wherein respective openings of the plurality of openings are arranged between adjacent mating lugs of the plurality of mating lugs; and
a plurality of mating lug rows, axially separated by mating slots, extending for a second row length; and
wherein a respective connector associated with the first coupling arrangement is secured to the second portion by one or more fasteners positioned radially outward from and parallel to a connector bore, the one or more fasteners extending through the respective connector at a connector flange area and into the second portion.

7. The flowline of claim 6, wherein axial movement for each respective flowline segment is enabled by aligning the plurality of connector lugs with the plurality of openings, each of the openings being adapted to receive a connector lug of the plurality of connector lugs.

8. The flowline of claim 6, wherein at least one of the first flowline segment length, the second flowline segment length, or the third flowline segment length is changed to facilitate coupling to the tree without removing material from the flowline.

9. A flowline, comprising:
a first flowline segment, the first flowline segment being coupled to a fracturing tree at a first end;
a second flowline segment, the second flowline segment coupled to a second end of the first flowline segment at a third end of the second flowline segment;
a connector coupled to the second flowline segment, the connector having a first bore with a first bore diameter and a connector bottom, forming at least a portion of the first bore, that extends at least partially into a second bore of the second flowline segment, the second bore of the second flowline segment being parallel to the first bore and the connector bottom configured to receive at least a portion of the first flowline segment through the portion of the first bore, the connector comprising:
a plurality of connector lugs extending into the first bore for a first radial distance, the connector lugs being positioned circumferentially about the first bore and arranged in connector lug rows, axially separated by connector spaces, extending for a first row length axially along the first bore; and a plurality of gaps, wherein respective gaps of the plurality of gaps are arranged between adjacent connector lugs of the plurality of connector lugs in a first alternating pattern;

a mating connector coupled to the connector, comprising:

a plurality of mating lugs extending radially outward for a second radial distance, the plurality of mating lugs being positioned circumferentially and arranged in mating lug rows, axially separated by mating slots, extending for a second row length; and a plurality of openings, wherein respective openings of the plurality of openings are arranged between adjacent mating lugs of the plurality of mating lugs in a second alternating pattern.

10. The flowline of claim 9, wherein the connector and mating connector are axially movable, with respect to one another, via alignment of the plurality of mating lugs and the plurality of gaps, wherein the plurality of mating lugs pass through the plurality of gaps.

11. The flowline of claim 10, wherein axial movement between the connector and mating connector is blocked when the plurality of mating lugs at least partially align with the plurality of connector lugs.

12. The flowline of claim 10, wherein an overall axial length is based, at least in part, on a respective position of the plurality of mating lugs within respective connector spaces.

13. The flowline of claim 9, further comprising:

a seal arranged within a groove formed in the mating connector, the seal and the groove being arranged axially higher than the plurality of mating lugs.

14. The flowline of claim 9, further comprising:

a seal positioned axially lower than both the connector and the plurality of mating lugs.

15. The flowline of claim 14, wherein the seal is compressed against both the first flowline segment and the connector.

16. The flowline of claim 9, wherein the plurality of mating lugs from a portion of the first flowline segment, an outer diameter of the plurality of mating lugs being equal to at least a portion of a segment outer diameter.

* * * * *